United States Patent Office 3,417,036
Patented Dec. 17, 1968

3,417,036
POLYETHERS CONTAINING POLAR GROUPS OBTAINED FROM POLYMERS OF EPIHALOHYDRINS REACTED WITH NUCLEOPHILIC REAGENTS
Edwin J. Vandenberg, Foulk Woods, Del., assignor to Hercules Incorporated, Wilmington, Del., a corporation of Delaware
No Drawing. Filed Aug. 7, 1967, Ser. No. 658,656
10 Claims. (Cl. 260—2)

ABSTRACT OF THE DISCLOSURE

Polyethers containing pendant polar groups such as carboxyl, carboxylate, sulfoxide or phosphorus ester groups are prepared by reacting a polymer of an epihalohydrin with a metal salt of an α-alkali metallocarboxylic acid, a mercaptocarboxylic acid, an alkyl sulfinyl carbanion, and alkane sulfenate or a mercaptophosphorus compound. Said polyethers are useful as primers for metals and other substrates or as dispersing agents, protective colloids, thickeners, textile sizes, paper additives and flocculating agents.

---

This invention relates to polyethers containing highly polar groups and more particularly to polyethers containing carboxyl, carboxylate, sulfoxide or phosphorus ester groups, and to a process for preparing the same.

Polyethers prepared by the homopolymerization and copolymerization of epihalohydrins with other epoxides and with oxetanes are well known. However, these polymers contain at best no more than one active hydrogen end group per molecule, and no pendant highly polar groups. Attempts to produce polyethers containing highly polar groups as, for example, free carboxyl groups, by direct polymerization or copolymerization techniques, however, have not yielded the desired products. For many end uses, it is desirable that the polymers be modified so as to improve their adhesion to metals, other substrates or coatings, to yield vulcanized products by cross-linking, to improve water solubility, etc. Hence, any means by which the polymer molecule can be modified greatly enhances the utility of the polymer.

Now, in accordance with this invention, it has been found that polyethers containing carboxyl, carboxylate, sulfoxide or phosphorus ester groups can be prepared by reacting polymers of epihalohydrins with a nucleophilic reagent which is a metal salt of an α-alkali metallocarboxylic acid, a mercaptocarboxylic acid, an alkyl sulfinyl carbanion, an alkane sulfenate or a mercaptophosphorus acid compound, and that from as little as 0.5% replacement of the halogen in the starting polymer up to 90% replacement by the nucleophile can be effected in this manner.

By the term "polymer of epihalohydrin" as used throughout this application is meant the homopolymers of epihalohydrins as well as the copolymers with one another and copolymers, terpolymers, tetrapolymers, etc., of epihalohydrins with up to 89.5% by weight of total monomer of at least one other cyclic oxide.

Thus, the present invention provides polyethers wherein from about 10 to 99.5% of the repeating units are epihalohydrin units, from 0 to 89.5% of the repeating units are units of at least one other cyclic oxide, and wherein from 0.5 to 90% of the repeating units of the polyether have the formula:

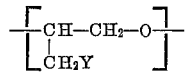

where Y is selected from the group consisting of:

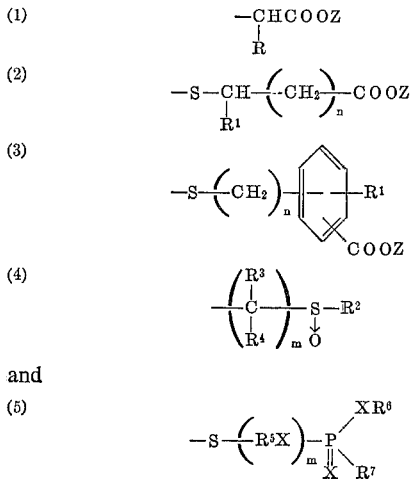

and where R is hydrogen, alkyl, cycloalkyl, alkenyl or aryl, $R^1$ is hydrogen, alkyl, or $—(CH_2)_n—COOZ$; $R^2$ is alkyl, $R^3$ and $R^4$ are hydrogen or alkyl; $R^5$ is alkylene, cycloalkylene, aralkylene, arylene or alkarylene; $R^6$ is alkyl, cycloalkyl, haloalkyl, aralkyl, aryl, haloaryl or alkaryl; $R^7$ is $R^6$ or $XR^6$; Z is hydrogen or a salt-forming metal; X is oxygen or sulfur; $n$ is a number from 0 to 8 and $m$ is 0 or 1; and to a process for producing the same. Suitable R groups include, in addition to hydrogen, alkyl groups containing 1 to 16 carbon atoms, such as methyl, ethyl, propyl, butyl, hexyl, octyl, dodecyl, octadecyl, and the like; cycloalkyl groups containing from 6 to 14 carbon atoms, such as cyclohexyl, methylcyclohexyl, methylisopropylcyclohexyl, 2,3- or 2,4- dimethylcyclohexyl and the like; alkenyl groups containing from 2 to 16 carbon atoms, such as vinyl, allyl, methallyl, crotyl and the like; and aryl groups containing 6 to 15 carbon atoms, such as phenyl, tolyl, xylyl, cumyl, tert-butylphenyl, nonylphenyl, naphthyl, and the like. Typical $R^1$ groups include, in addition to hydrogen and the alkyl groups recited under R, carboxy and carboxyalkyl groups. The alkyl groups of $R^2$, $R^3$, and $R^4$ are as recited for R, as are the alkyl, cycloalkyl and aryl groups of $R^6$.

The new polyethers of this invention are prepared, as stated, by reacting a polymer of an epihalohydrin with a nucleophilic reagent which is a metal salt of an α-alkali metallocarboxylic acid, a mercaptocarboxylic acid, an alkyl sulfinyl carbanion, an alkane sulfenate or a mercaptophosphorus acid compound. The salt-forming metal is preferably a Group IA, II-A, II-B, III-A, IV-A or VIII metal such as sodium, potassium, lithium, magnesium, calcium, strontium, barium, zinc, cadmium, aluminum, tin, lead, iron, cobalt or nickel and most preferably the alkali metal is sodium, potassium, or lithium. The carboxylic acid portion of the α-alkali metallocarboxylate is a monocarboxylic acid containing from 2 to 18 carbon atoms, and having a hydrogen of the α-carbon substituted with a Group IA metal. Typical of such salts include the metal salts of α-sodium, -potassium or -lithium acetic acid, propionic acid, butyric acid, isobutyric acid, pentanoic acid, oleic acid, stearic acid, phenylacetic acid, cyclohexylacetic acid, 3-methylbutanoic acid, and the like. The metal salts of the mercaptocarboxylic acids which can be used are salts of mercapto mono- or dicarboxylic acids containing from 2 to 25 carbon atoms wherein each mercapto and carboxyl hydrogen has been replaced by a salt-forming metal and preferably by sodium, potassium or lithium. Typical salts of this type include the sodium, potassium and lithium salts of mercaptoacetic acid, α-mercaptopropionic acid, β-mercaptopropionic acid, α-mercaptobutyric acid, the mercaptopentanoic acids, the 9(10)-mercaptostearic acid, o-, m- or p-mercaptobenzoic acid, o-, m- or p-mercaptomethyl benzoic acid, o-, m- or p-mercaptoethyl benzoic acid, 3-(8-mercaptooctyl) benzoic acid, 3-(2-methyl-6-mercaptoheptyl) benzoic acid, 2-mercapto-4-methyl-benzoic acid, the mercaptophthalic acids (any isomer), mercaptomalonic acid, mercaptosuccinic acid, and mercaptoadipic acid.

The metal salts of alkyl sulfinyl carbanions are salts of carbanions having the formula

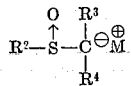

in which a sulfoxide group is adjacent to the carbon atom bearing the negative charge and wherein $R^2$, $R^3$ and $R^4$ are indicated above and M is a Group IA metal. Such salts are formed by reacting at a temperature from about 0° to about 100° C., a strong base such as alkali metal (e.g., sodium, potassium or lithium) amides, alkali metal hydrides, alkali metal alkyls (wherein the alkyl group contains from 1 to 6 carbon atoms) or alkali metal oxides with a sulfoxide having the formula

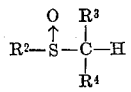

where $R^2$, $R^3$ and $R^4$ are as previously stated, and $R^2$ is attached to the sulfur atom of the sulfoxide group by a single covalent bond between carbon and sulfur. If desired, the salt-forming reaction can be carried out in excess of the sulfoxide as diluent or diluent which is non-reactive or less reactive with the base than the sulfoxide starting material. Reactive compounds such as water, acids, alcohols, most ketones and many halogen-containing compounds, however, if present in sufficient amounts to react completely with the base, will prevent the desired formation of the salt of the sulfinyl carbanion. Suitable solvents or diluents which are non-active include the aliphatic or aromatic hydrocarbons, aliphatic, aromatic or mixed aliphatic-aromatic ethers, cyclic ethers, amides and the like. There will normally be present in the reaction medium a stoichiometric amount or an excess of the sulfoxide starting material relative to the amount of base to prevent free base from interfering with subsequent reactions of the salts of carbanions.

When sodium and/or potassium metal are reacted with the sulfoxide, the alkali metal alkane sulfenates

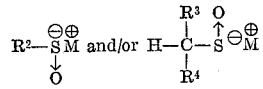

(depending on which side of the sulfinyl group cleavage occurs) and metal alkyls are produced, the metal alkyl reacting immediately with unreacted starting sulfoxide to form the alkyl sulfinyl carbanion salt. When the alkali metal is potassium, approximately equal molar amounts of potassium alkane sulfenate and potassium alkyl sulfinyl carbanion are formed. However, when the metal is sodium, the ratio of alkyl sulfinyl carbanion salt to alkane sulfenate salt in the product is normally about 2:1.

Preferred sulfoxides which are used as starting material to form the alkyl sulfinyl carbanions and alkane sulfenates include dimethylsulfoxide, ethyl methylsulfoxide, methyl hexylsulfoxide, di-n-butylsulfoxide, tert-butyl methylsulfoxide, dodecyl methylsulfoxide, dioctylsulfoxide, 2-ethylhexyl isopropylsulfoxide, octadecyl methylsulfoxide, and the like.

The mercapto phosphorus compounds which are useful as nucleophilic reagents in preparing the products of this invention are the metal salts of thiophosphoric acids and thiophosphonic acids, or of the mercapto-substituted esters thereof. Typical of these reagents are the metal salts of the O,O-dimethyl, -diethyl, -dibutyl, -diphenyl, -ditolyl, -dibenzyl, -dicyclohexyl, -bis(2-chloroethyl), -bis(p-chlorophenyl), O-ethyl O-phenyl, O-methyl O-(2-chloroethyl), and the like esters of phosphorothioic acid having the formula

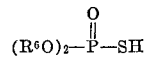

of phosphorodithioic acid having the formula

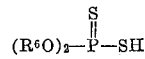

and the S-(2-mercaptoethyl), S-(4-mercaptophenyl), and the like, esters of said diesters. Another group of such reagents are the metal salts of corresponding S,S-diesters of phosphorotrithioic acid having the formula

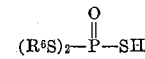

and of phosphorotetrathioic acid having the formula

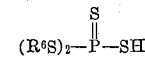

and the S-(2-mercaptoethyl), S-(3-mercaptopropyl), S-(2-mercaptophenyl), and the like, esters of said S,S-diesters. Another group of such compounds are the O-methyl S-methyl, O-ethyl S-butyl, O-phenyl S-methyl, and the like, diesters of phosphorodithioloic acid having the formula

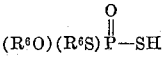

phosphorodithiolothionic acid having the formula

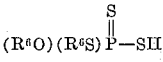

and the S-(2-mercaptoethyl), S-(4-mercaptophenyl), and the like esters of said diesters. Still another group of such compounds are the phosphates having the formula

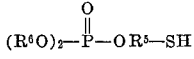

such as dimethyl β-mercaptoethyl phosphate, diethyl 4-mercaptophenyl phosphate, dibutyl β - mercaptoethyl phosphate, and the like; and the corresponding thiophosphates having the formula

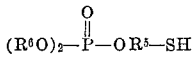

the O-mercapto-substituted esters of the O,S-diesters of phosphorodithioic acid having the formula

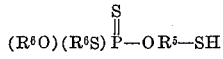

such as O-(2-mercaptoethyl), O,S-dimethyl phosphorodithioic acid and the like; and the O-mercapto-substituted esters of the O,S-diesters of phosphorothioic acid having the formula

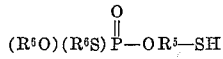

such as O-(4-mercaptophenyl) O,S-diethyl phosphorodithioic acid and the like. Also useful are the O-esters of phosphonodithioic acid having the formula

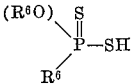

such as the O-methyl, -phenyl and the like esters of methyl, cyclohexyl, phenyl, and the like, phosphonodithioic acid; and the S-mercapto-substituted esters thereof having the formula

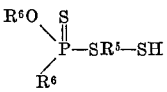

and the corresponding esters of methyl, ethyl, butyl, phenyl, benzyl, and the like, phosphonothioic acid having the formula

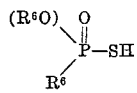

and

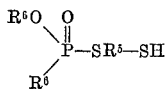

respectively, as well as the O-mercapto-substituted esters of methyl, ethyl, butyl, cyclohexyl, phenyl, benzyl, tolyl, and the like, phosphonic acid having the formula

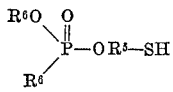

As will be apparent, all of the above recited phosphorus compounds have the general formula

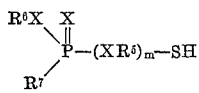

where $R^5$, $R^6$, $R^7$, X and $m$ are as previously defined.

The salts used in this invention are usually preformed and used as such in the nucleophilic reaction. However, if desired, they can be formed in situ during the reaction, as, for example, by adding the salt-forming nucleophilic reagent and the necessary amount of metal-containing base such as sodium hydroxide, lithium hydroxide, potassium hydroxide, magnesium oxide, calcium oxide, calcium stearate, strontium oxide, barium hydroxide, zinc oxide, xinc stearate, cadmium hydroxide, aluminum oxide, aluminum hydroxide, stannous or stannic hydroxide, lead oxide, the oxides of iron, cobalt or nickel, nickel stearate, and the like, separately to the reaction medium containing the polymer of epichlorohydrin.

The polymers of epihalohydrins which are reacted with the nucleophilic reagents of this invention are the known crystalline and amorphous homopolymers produced from any epihalohydrin, e.g., epichlorohydrin, epibromohydrin, epiiodohydrin or epifluorohydrin or any mixture of these epihalohydrins, and the known crystalline and amorphous copolymers of epihalohydrins such as epifluorohydrin, epibromohydrin, epiiodohydrin and preferably epichlorohydrin with up to 89.5% and preferably with from 20–80% by weight of the total monomers of at least one other cyclic oxide which is preferably an oxirane or oxetane. Specific oxiranes and oxetanes which can be copolymerized with epihalohydrin include the alkylene oxides having 1 to 20 carbon atoms, such as, for example, ethylene oxide, propylene oxide, butene-1 oxide, cis-and trans-butene-2 oxide; the cycloaliphatic epoxides containing 6 to 12 carbon such as cyclohexene oxide and the like; the phenyl alkylene oxides such as styrene oxide, etc.; the saturated glycidyl ethers such as methyl glycidyl ether, ethyl glycidyl ether, phenyl glycidyl ether, etc.; the ethylenically unsaturated epoxides such as the unsaturated glycidyl ethers, the monoepoxides of dienes or polyenes or the glycidyl esters, etc.; and the oxetanes such as oxetane, also designated as trimethylene oxide, the 2- or 3-mono-substituted oxetanes or the 2,2- or 3,3-di-substituted oxetanes. Other cyclic oxides suitable for use with the epihalohydrin include the tetrahydrofurans such as tetrahydrofuran, 2-, 3- and 4-methyltetrahydrofuran, 2,3-dimethyltetrahydrofuran, 2,3,4-trimethyltetrahydrofuran, 2,3-diethyltetrahydrofuran, 2,3-diphenyltetrahydrofuran, and the like. Exemplary of suitable polymers are those described in U.S. Patents 3,058,922, 3,158,580, 3,158,581 and 3,158,591.

The particular conditions for preparing the polyethers containing the highly polar groups of the invention will vary depending on the starting polyether, the reactants, diluent (if present), the amount of modification desired, the ultimate end use, etc. In general, the reaction can be carried out in bulk, in diluent dispersion, or in a solvent for the polyether. In many cases, it is desirable to carry out the substitution reaction in the bulk while mixing the polymer at elevated temperature in a mixer, extruder, etc., with an appropriate base which does not form deleterious halide, by-products, as with calcium stearate, zinc stearate, zinc oxide, magnesium oxide, calcium oxide, etc. during normal compounding and just prior to fabrication. If desired, the reaction in bulk can also be carried out in a mixer or extruder as a separate mixing operation prior to the normal compounding step.

The reaction is usually carried out at temperatures varying from 0° C. to 250° C., and preferably at 30° C. to 180° C., using from a stoichiometric amount up to a large excess of the amount of the nucleophilic reagent necessary for the desired degree of substitution. Suitable diluents or solvents which can be utilized if it is desired to carry out the reaction in liquid phase include, for example, benzene, toluene, xylene, acetone, dimethylsulfoxide, dimethylformamide, hexamethylphosphoramide, acetonitrile, dimethyl acetamide, dioxane, tetrahydrofuran, etc., and mixtures thereof. Active hydrogen diluents or solvents such as water, alcohols, and the like, can also be used in the case of the mercaptocarboxylates and mercaptophosphorus compounds, although the non-active hydrogen compounds are preferred.

The initial reaction products of this invention, when the nucleophilic reagent is a metal salt of an α-alkali metallocarboxylic acid, or mercaptocarboxylic acid, contain salt groups which are readily converted to the free acid form by treatment with acid under appropriate conditions. This treatment can be readily accomplished during the isolation procedure by washing the reaction mixture, after the nucleophilic reaction is complete, with the desired agent.

The following examples illustrate the preparation of the modified polyethers of this invention. All parts and percentages are by weight unless otherwise indicated. The toluene, xylene and dimethylsulfoxide (DMSO) used as solvents and the dimethylsulfoxide reactant used in the examples were dried prior to use by passage through a molecular sieve column. Unless otherwise indicated, the stabilizer used in the examples was the reaction product of 1 mole of crotonaldehyde and 3 moles of 3-methyl-6-tert-butyl phenol, the product being essentially 1,1,3-tris(2-methyl-4-hydroxy-5-tert-butylphenyl) butane. The molecular weight of the polymers is indicated by their reduced specific viscosities (RSV). By the term "reduced specific viscosity" is meant $\eta_{sp./c.}$, determined on a 0.1% solution in 97% α-chloronaphthalene-3% acetylacetone at 100° C. unless otherwise indicated.

Example 1

Ten (10) parts of an epichlorohydrin-ethylene oxide copolymer (70% by weight epichlorohydrin), having an RSV of 5.0, and a sulfate ash of 0.7% and containing 0.5% stabilizer, was dissolved in 218 parts of dry toluene at 25° C. Then 5.0 parts (54% of theory) of α-sodiosodium acetate was added to the solution and the solution heated at reflux with stirring. After 4 hours, the reaction was shortstopped by adding 4 parts of anhydrous ethanol and the stirring continued for 10 minutes. The toluene-insoluble product was separated from ½ of the reaction mixture and the product was washed once with toluene, washed neutral with methanol and then once with methanol containing 0.2% stabilizer, and dried for 16 hours at 80° C. in vacuo. The product (27% conversion) was a rubbery polymer containing 44% epichlorohydrin and having a sulfate ash of 12% (theory for complete substitution, 36%) which indicated that 33% of the epichlorohydrin units were replaced with

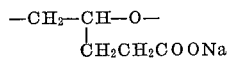

units. The toluene-soluble product was precipitated from the filtrate with 4 volumes of methanol and the precipitate recovered, washed neutral with methanol and with a 0.02% methanolic solution of the stabilizer, as above, and dried. The toluene-soluble product (73% conversion) was a tough rubber of RSV 5.1 containing 66% epichlorohydrin and having a sulfate ash of 0.27%, indicating that this fraction contained 0.5%

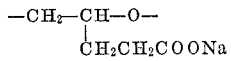

units.

The remaining half of the shortstopped reaction mixture was next placed in a sealed reaction vessel and reheated for an additional 6 hours at 150° C. with periodic shaking, after which time the reaction was stopped and the toluene-insoluble product recovered as above. The product was a tough, dark brown rubber (about 20% conversion) containing 41% epichlorohydrin and having a sulfate ash of 7.6%, indicating that it contained 15%

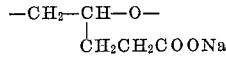

units. The toluene-soluble polymer, recovered by stripping off the solvent from the filtrate and drying, gave a tough, brown, snappy rubber (about 28% conversion) containing 59% epichlorohydrin and having a sulfate ash of 10.8%, indicating that it contained 21%

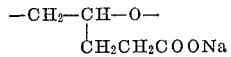

units.

Example 2

To 20 parts of the epichlorohydrin-ethylene oxide copolymer of Example 1 dissolved in 440 parts of dry xylene was added 10 parts of α-sodiosodium acetate and the mixture heated for 4 hours at 137–138° C. The reaction mixture initially became thick but after 2.2 hours of reaction time became thinner with a black coating developing on the bottom of the reaction vessel in the vicinity of the heating element. After shortstopping the reaction with 8 parts of anhydrous ethanol, the xylene solution was decanted from the vessel and the vessel contents washed twice with 50 parts of xylene. The xylene-soluble polymer was precipitated from the filtrate, combined with the xylene washes using 4 volumes of methanol, and the precipitate was collected and dissolved in excess 1% hydrogen chloride in ethanol. Water was next added to the solution (polymer did not precipitate) and the solution was partially stripped, dialyzed neutral, stripped and dried at 80° C. for 16 hours under vacuum. The product was a viscous brown liquid (4% conversion) having an RSV of 0.15.

The xylene-insoluuble material remaining in the vessel was treated with 4 volumes of methanol and the methanol-insoluble fraction collected, treated with ethanolic hydrogen chloride and recovered as above except that a fraction of this xylene-insoluble polymer which was insoluble in the ethanolic hydrogen chloride was also collected, washed neutral and dried. The xylene-insoluble, acid-soluble fraction was a viscous, dark brown liquid (19.5% conversion) having an RSV of 0.16 and contained 51% epichlorohydrin, indicating that it contained 23% of the

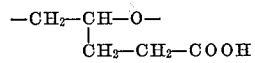

units. The xylene-insoluble, acid-insoluble fraction was a dark rubbery solid (7.5% conversion) having an RSV of 0.11.

Example 3

One (1) part of the epichlorohydrin-ethylene oxide copolymer of Example 1 was dissolved in 27.5 parts of dimethylsulfoxide at 50° C. in a capped tube under nitrogen. Then 0.5 part of α-sodiosodium acetate dispersed in 5.5 parts of dimethylsulfoxide was added and the reaction mixture cooled to 30° C. and maintained at that temperature for 7 hours, with stirring, after which time the reaction was shortstopped with 4 parts of anhydrous ethanol, and the polymer was precipitated with 4 volumes of methanol. The polymer was collected, washed neutral with methanol and once with 0.2% methanolic solution of stabilizer, and the product was dried at 80° C. for 16 hours under vacuum. The methanol-insoluble product so obtained (64% conversion) was a tough, snappy rubber of RSV 0.67 containing 39% epichlorohydrin and having a sulfate ash of 0.5%, indicating that the product contained 1.0% of the

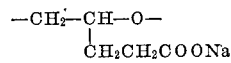

monomer units. The methanol filtrate and washes (which did not give a precipitate with water or 3% aqueous hydrogen chloride) were then dialyzed neutral, stripped and dried to give a tacky rubber (14% conversion) which did not redissolve in water and which contained 27.5% epichlorohydrin, indicating that about 59% of the epichlorohydrin units had undergone the desired substitution reaction.

Example 4

The general procedures of Example 3 was repeated except that 5.0 parts of the epichlorohydrin-ethylene oxide copolymer was dissolved in 138 parts of dimethylsulfoxide at 65° C., 1.0 part of α-sodiosodium acetate was added as a dispersion in 13 parts of dimethylsulfoxide, and the reaction was carried out at 65° C. for 7.3 hours. After one hour of reaction time, the reaction mixture became gelatinous and browner, changing to a fluid without gel after 3.5 hours and remaining the same for the remainder of the reaction time. Tests on small aliquots of the shortstopped reaction mixture gave no precipitate with 4 volumes of methanol but did give a precipitate with water. Polymer was then isolated by adding 30 parts of 3% aqueous hydrogen chloride and 2 volumes of water to the shortstopped reaction mixture, the insoluble portion was collected and washed neutral with water, and the product was dried at 80° C. for 16 hours under vacuum. The acidified water-insoluble product (77% conversion) had an RSV of 0.25, contained 58% epichlorohydrin and gave a sulfate ash of 0.4%. Based on the chlorine analysis, this product contained 14%

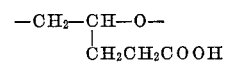

units.

Water-soluble polymer was recovered from the filtrate and water washes by dialyzing until neutral, stripping and drying. The product (8% conversion) was a tacky mass containing 40% epichlorohydrin.

Examples 5–6

The procedure of Example 4 was repeated except that 0.30 part of α-sodiosodium acetate was employed and the starting polymer was amorphous poly(epichlorohydrin) containing 1% phenyl β-naphthylamine as stabilizer and having an RSV of 1.6 (Example 5) and crystalline poly(epichlorohydrin) containing 0.3% 4,4'-thiobis-(3-methyl-6-tert-butylphenol) as stabilizer and having an RSV of 5.5 (Example 6). The acidified water-insoluble product of Example 5 was a tacky mass (81% conversion) of RSV 0.11 (4.5 hours) containing 94% epichlorohydrin and 6% of the

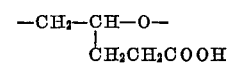

units. The acidified water-insoluble product of Example 6 was a white, soft, crystalline solid (96% conversion) melting at 108.5° C. (DTA), having an RSV of 0.32 and containing 96% epichlorohydrin units and 4%

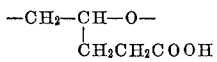

units.

Example 7

The general procedure of Example 4 was repeated, except that in this example the starting polymer was 5 parts of a copolymer of epichlorohydrin and ethylene oxide (69.5% by weight epichlorohydrin) of RSV 5.7, containing 0.7% stabilizer, and having a sulfate ash of 0.02%, 0.265 part mercaptoacetic acid and 0.230 part ground sodium hydroxide were substituted for the α-sodiosodium acetate, and the reaction time was 6.3 hours. The acidic water-insoluble product (98% conversion) was a dark-colored, snappy rubber of RSV 4.1 containing 67.9% epichlorohydrin. The sulfur analysis of 1.5% sulfur (theory, 1.39%) indicated that all of the mercaptoacetic acid had combined with the polymer to give

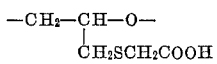

groupings.

Example 8

The procedure of Example 7 was repeated except that in this example, 25 parts of the starting polymer was dissolved in 688 parts of dimethylsulfoxide, 1.68 parts of sodium mercaptoacetate was substituted for the mercaptoacetic acid, 0.57 part ground sodium hydroxide was used, and the reaction time was 6.0 hours. The polymer was isolated from the gelatinous reaction mixture according to the procedure of Example 4, washed neutral with water, and then dried for 16 hours at room temperature. The acidic water-insoluble product (85% conversion) was a very highly swollen gel in dimethylsulfoxide. The sulfur analysis indicated that 1.3% addition (theory 6.3) of mercaptoacetic acid had taken place.

Examples 9–11

Example 8 was repeated, using various mercaptocarboxylic acids in place of the sodium mercaptoacetate, the amount of mercaptocarboxylic acid and ground sodium hydroxide for each example being as follows:

TABLE 1.—MERCAPTOCARBOXYLIC ACID

| Example | Acid | Parts by wt. | Sodium Hydroxide (parts by wt.) |
| --- | --- | --- | --- |
| 9 | Thiosalicylic | 2.22 | 1.15 |
| 10 | β-mercaptopropionic | 1.40 | 1.15 |
| 11 | Mercaptosuccinic | 2.16 | 1.72 |

The acidic water-insoluble polymers were isolated as in Example 4. The isolated polymer of Example 9 was soluble in dimethylsulfoxide and was a tough, snappy rubber (63% conversion) of RSV 1.2 containing 66% epichlorohydrin and, based on sulfur analysis, 3.2% thiosalicyclic acid addition (theory, 8.3%). The isolated polymer of Example 10 was a tough rubber (86% conversion) of RSV greater than 0.14 containing, by sulfur analysis, 1.8% mercaptopropionic acid addition (theory, 5.4%). The isolated polymer of Example 11 was a snappy rubber (77% conversion) of RSV greater than 0.9 containing 0.8% mercaptosuccinic acid addition (theory, 8.1%).

Example 12

Example 7 was repeated except that in this example 0.54 part of the diethyl ester of dithiophosphoric acid [$(C_2H_5O)_2P(S)SH$] was substituted for the 0.265 part of mercaptoacetic acid, and 0.116 part of ground sodium hydroxide was used. The acidic water-insoluble product (4.9 parts) was a snappy rubber of RSV 2.8, having a pleasant odor and containing 0.46% sulfur, which corresponds to 1.34% of dithiophosphoric acid ester addition.

Example 13

The procedure of Example 7 was repeated except that 11 parts of the reaction product of butyl lithium and dimethylsulfoxide was used in place of the mercaptoacetic acid and sodium hydroxide, and the reaction was carried out for 6 hours at 65° C. The butyl lithium-dimethylsulfoxide reaction product was prepared by adding 1.32 parts of a 3.7 molar solution of butyl lithium in benzene to 22 parts of dry dimethylsulfoxide, and stirring the mixture for 1 hour at 25° C. The polymer so obtained amounted to 3.04 parts and was a water-insoluble, tacky rubber having an RSV of 0.39 and containing (based on sulfur analysis) 3.7% of

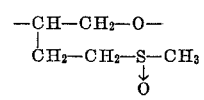

units.

The foregoing examples demonstrate the production of polyethers containing carboxyl, phosphoric ester and sulfoxide groups. Thus, this invention provides a ready source of polymers containing highly polar groups. These polymers are useful for promoting adhesion of epihalohydrin polymers to metals and other substrates and can be used as a primer for such substrates prior to coating or can be added in small amounts to epihalohydrin polymers, or to other polymers, prior to application. Additionally, the polyethers containing the sodium carboxylates and sulfoxide groups, and particularly those of relatively high degree of substitution which are water soluble, are useful as dispersing agents, protective colloids, thickeners, textile sizes, paper additives, flocculating agents, and the like. The carboxyl-containing polyethers of this invention can also be cross-linked by metal ions to yield useful vulcanized products. This utility is shown by the following Examples 14–18 which demonstrate the cross-linking of the products of Examples 7–11. In these examples, vulcanizable compositions were prepared by mixing on a two-roll mill 100 parts of the polyether, 8.65 parts of stearic acid and zinc oxide (plus dioctyldecyl disulfide in Example 15), and press curing the composition in a mold for 60 minutes at 340° F. (Examples 14 and 16 to 18) or at 300° F. (Example 15.) These examples further confirm the presence of the carboxyl groups in the polyether since unmodified polyethers do not cross-link with zinc oxide. Details of the compositions of these examples and the properties of the cured products are given in Table 2 below.

TABLE 2

| Example No. | 14 | 15 | 16 | 17 | 18 |
| --- | --- | --- | --- | --- | --- |
| Composition (parts by wt.): | | | | | |
| Polymer of Example 7 | 100 | | | | |
| Polymer of Example 8 | | 100 | | | |
| Polymer of Example 9 | | | 100 | | |
| Polymer of Example 10 | | | | 100 | |
| Polymer of Example 11 | | | | | 100 |
| Zinc Oxide | 12.3 | 12.3 | 12.3 | 12.3 | 24.6 |
| Dioctyldecyl disulfide | | 1.0 | | | |
| Properties: | | | | | |
| 300% Modulus (p.s.i.) | | 135 | 65 | 60 | 120 |
| Tensile Strength (p.s.i.) | 80 | 1,375 | 405 | 430 | 455 |
| Maximum Elongation (Percent) | 515 | 1,290 | 1,140 | 1,160 | 1,300 |
| Shore "A" Hardness | 23 | 32 | 17 | 17 | 30 |
| Break Set (Percent) | 45 | 45 | 15 | 40 | 60 |

Example 19

Example 15 was repeated except that 20.4 parts of aluminum isopropoxide was substituted for the 12.3 parts of zinc oxide. The physical properties of the cured product were:

| | |
|---|---|
| 300% modulus (p.s.i.) | 635 |
| Tensile strength (p.s.i.) | 730 |
| Maximum elongation (percent) | 370 |
| Shore "A" Hardness | 42 |
| Break set (percent) | 5 |
| Percent gel/swell after 4 hours in toluene at 80° C. | 96/208 |

What I claim and desire to protect by Letters Patent is:

1. An essentially linear polyether wherein from about 10 to 99.5% of the repeating units are epihalohydrin monomer units, from 0 to 89.5% of the repeating units are monomer units of at least one other cyclic oxide and from 0.5 to 90% of the repeating units have the formula

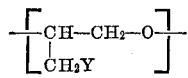

where Y is selected from the group consisting of (1) 

(2) 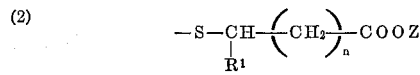

(3) 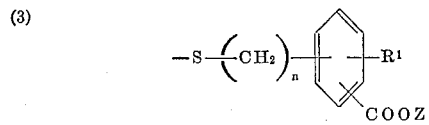

(4) 

and (5) 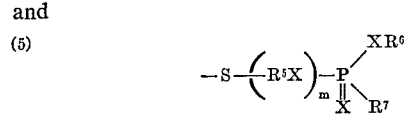

where R is selected from the group consisting of hydrogen, alkyl, cycloalkyl, alkenyl and aryl, $R^1$ is selected from the group consisting of hydrogen, alkyl and

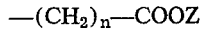

$R^2$ is alkyl, $R^3$ and $R^4$ are hydrogen or alkyl, $R^5$ is selected from the group consisting of alkylene, cycloalkylene, aralkylene, arylene and alkarylene, $R^6$ is selected from the group consisting of alkyl, cycloalkyl, haloalkyl, aralkyl, aryl, haloaryl and alkaryl, $R^7$ is $R^6$ or $XR^6$, Z is hydrogen or a salt-forming metal, X is oxygen or sulfur, $n$ is a number from 0 to 8, and $m$ is 0 or 1.

2. The polyether of claim 1 wherein the cyclic oxide is selected from the group consisting of oxiranes, oxetanes and tetrahydrofurans.

3. The polyether of claim 2 wherein the epihalohydrin is epichlorohydrin.

4. The polyether of claim 3 wherein the oxirane is an alkylene oxide.

5. The polyether of claim 4 wherein from 10 to 99.5% of the repeating units are epichlorohydrin units, from 0 to 89.5% of the repeating units are ethylene oxide, and from 0.5 to 90% of the repeating units have the formula

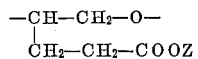

where Z is hydrogen or sodium.

6. The polyether of claim 4 wherein from 10 to 99.5% of the repeating units are epichlorohydrin units, from 0 to 89.5% of the repeating units are ethylene oxide, and from 0.5 to 90% of the repeating units have the formula

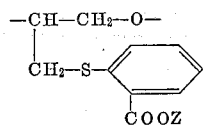

where Z is hydrogen or sodium.

7. The polyether of claim 4 wherein from 10 to 99.5% of the repeating units are epichlorohydrin units, from 0 to 89.5% of the repeating units are ethylene oxide, and from 0.5 to 90% of the repeating units have the formula

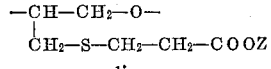

where Z is hydrogen or sodium.

8. The polyether of claim 4 wherein from 10 to 99.5% of the repeating units are epichlorohydrin units, from 0 to 89.5% of the repeating units are ethylene oxide, and from 0.5 to 90% of the repeating units have the formula

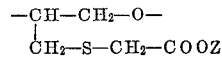

where Z is hydrogen or sodium.

9. The polyether of claim 4 wherein from 10 to 99.5% of the repeating units are epichlorohydrin units, from 0 to 89.5% of the repeating units are ethylene oxide, and from 0.5 to 90% of the repeating units have the formula

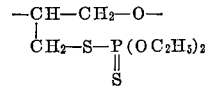

10. The polyether of claim 1 wherein from 10 to 99.5% of the repeating units are epichlorohydrin units and from 0.5 to 90% of the repeating units have the formula

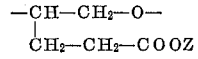

where Z is hydrogen or sodium.

No references cited.

F. D. ANDERSON, *Acting Primary Examiner.*

U.S. Cl. X.R.

117—132, 139.5; 162—164; 209—5; 210—54; 252—203, 352; 260—18, 47, 88.3, 79